United States Patent [19]

Karg

[11] 4,183,887

[45] Jan. 15, 1980

[54] METHOD FOR PRODUCING FREE FLOWING PARTICLES OF ELASTOMERIC MATERIAL

[75] Inventor: Rudolph F. Karg, Baton Rouge, La.

[73] Assignee: Copolymer Rubber & Chemical Corporation, Baton Rouge, La.

[21] Appl. No.: 791,696

[22] Filed: Apr. 28, 1977

[51] Int. Cl.² .............................................. B22D 23/08
[52] U.S. Cl. ........................................ 264/130; 34/10; 264/131; 264/138; 264/147; 528/502
[58] Field of Search ............... 264/130, 131, 121, 127, 264/14, 147, 7, 138, 300; 260/897 C, 29.6 F; 428/403, 407; 252/12; 34/10; 528/502

[56] References Cited

U.S. PATENT DOCUMENTS

| | | | |
|---|---|---|---|
| 2,879,173 | 3/1959 | Yacoe | 264/130 |
| 3,005,795 | 10/1961 | Busse et al. | 260/897 C |
| 3,054,761 | 9/1962 | Moore | 264/127 |
| 3,533,930 | 10/1970 | Lawton et al. | 264/127 |
| 3,597,372 | 8/1971 | Cook | 260/897 C |
| 3,600,309 | 8/1971 | Loser et al. | 252/12 |
| 3,720,742 | 3/1973 | Shelton et al. | 264/300 |
| 3,864,124 | 7/1975 | Breton et al. | 264/127 |
| 3,864,432 | 2/1975 | Adler et al. | 260/897 C |
| 3,940,455 | 2/1976 | Kaufman | 260/897 C |
| 4,005,054 | 1/1977 | Bonnefon et al. | 252/176 R |
| 4,042,747 | 8/1977 | Breton et al. | 264/127 |

FOREIGN PATENT DOCUMENTS 1299410 12/1962 France ................................. 260/29.6 F Primary Examiner—Jay H. Woo
Attorney, Agent, or Firm—McDougall, Hersch & Scott

[57] ABSTRACT

Elastomeric particles which are rendered free flowing by treatment with the combination of a finely divided partitioning agent and a fibrilatable polymer which has been fibrilated to form a network on the surface of the elastomeric material with retention of the partitioning agent thereby.

9 Claims, No Drawings

METHOD FOR PRODUCING FREE FLOWING PARTICLES OF ELASTOMERIC MATERIAL

This invention relates to the preparation of free flowing powders or other particulates of elastomeric material.

It is an object of this invention to produce and provide a method for producing elastomeric (rubber) particles, such as powders or crumb, and particularly black masterbatch crumb, having free flowing characteristics to provide for more efficient packaging and subsequent handling for processing with other materials and molding in the production of the elastomeric products.

The invention is addressed to the manufacture of rubber powders, crumb, or other particulate from natural or synthetic rubbers. When the elastomeric material is a synthetic rubber latex it may be any suitable latex prepared by prior art processes wherein a polymerizable monomeric material or a mixture of polymerizable monomeric materials is emulsified in aqueous medium by means of an emulsifying agent, such as a soap, rosin soap or other suitable surface active agent, and the polymerization made to take place at a suitably controlled temperature in the presence of a catalyst and/or other regulating material. The primary emulsifier preferably should be a material that is unstable at low pH, such as a long chain fatty acid soap as represented by sodium or potassium oleate or stearate, the rosin soaps or mixtures thereof. The polymerization of the monomer is generally short-stopped at a desirable stage short of complete conversion, such as at above 60% and preferably 65–70% conversion, and the unreacted monomer or monomers removed by conventional flashing and/or stripping before introducing the formed latex to a head tank. As is well understood in the art, it is also advantageous, in the preparation of certain synthetic rubber latices, such as SBR (styrene-butadiene latices) to carry out the polymerization in a cold polymerization at low temperature, such as at about 41° F. The polymerization may be carried out at higher temperature, such as up to 122° F., when preparing SBR latices by a prior art hot rubber process.

Examples of polymerizable materials useful in preparing synthetic rubber latices are the various 1,3-butadienes such as 1,3-butadiene, methyl-2-butadiene-1,3-piperylene, and 2,3-dimethyl-butadiene-1,3. If desired, the polymerizable material may be a mixture of a 1,3-butadiene, such as 1,3-butadiene itself with another polymerizable compound which is capable of forming rubbery copolymers with the 1,3-butadienes. For example, such polymerizable mixtures may contain up to 50% (or higher in some instances) of a compound which contains a $CH_2=C=$ group wherein at least one of the disconnected valences is attached to an electroactive group, i.e., a group which substantially increases the electrical dissymmetry or polar character of the molecule. Examples of compounds containing the aforementioned group and copolymerizable with the 1,3-butadienes are aryl olefins, such as styrene and vinyl naphthlene; the alpha methylene carboxylic acids, and their esters, nitriles and amides, such as acrylic acid, methyl acrylate, methyl methacrylate, acrylonitrile, methacrylonitrile and methacrylamide; isobutylene, methyl vinyl ethers; and methyl vinyl ketone. The foregoing polymerizable substances or mixtures are examples of materials that may be used in the preparation of rubbery polymer latices and solid rubbery polymers which along with natural rubber and polychloroprene, may be referred to herein as homopolymers of conjugated diolefins and copolymers of conjugated diolefins and ethylenically unsaturated monomers. The preferred rubbery polymer of latex is prepared from a polymerizable material which is a mixture of butadiene and styrene wherein the styrene content of the mixture, by weight, is less than about 50%. However, any suitable butadiene-styrene synthetic or latex may be used in practicing the present invention.

For a fuller description of the preparation of such elastomeric materials and the formation of wet crumb thereof, reference can be made to U.S. Pat. No. 3,055,856, issued Sept. 25, 1962, and entitled "Aqueous Suspension of Carbon Black, Apparatus and Method for Preparing Same, Method for Mixing Same with Rubber and Product Obtained Thereby"; U.S. Pat. No. 3,079,360 issued Feb. 26, 1963, and entitled, "Process for Multistep Coagulation of Rubber Latices"; and U.S. Pat. No. 3,092,603, issued June 4, 1963, and entitled "Method of Continuously Coagulating Rubber Latices with Fresh Coagulant and the Resultant Product."

The invention has application also to a wide variety of other elastomeric materials formed by emulsion polymerization or copolymerization of monoolefinic, conjugated diolefinic, or polyolefinic compounds and coagulatable from aqueous medium or from solvent solution to form crumb, as in the preparation of EPM or EPDM rubbers. Conditions for preparation of EPDM and EPM elastomers are well known to the art. For example, for patents which describe procedures for the preparation of EPDM elastomers from monomeric mixtures of alphaolefins and polyenes, reference can be made to U.S. Pat. Nos. 2,933,480; 3,093,620; 3,093,621 and 3,211,709, which are incorporated herein by reference.

Such EPDM elastomers are formed by interpolymerization of monomers of ethylene, one or more higher monoolefins having 3–16 and preferably 3–10 carbon atoms, and one or more polyenes. The polyene monomers may include the bridged ring compound, straight or branched chain polyenes or cyclic polyenes containing, for example, 4–20 carbon atoms and preferably about 5–10 carbon atoms and 2 carbon-to-carbon double bonds. The preferred straight chain polyene is generally selected of 1,4-hexadiene, but other straight chain dienes containing 2–18 carbon atoms may be used, such as those disclosed in U.S. Pat. No. 2,933,480. The preferred cyclic polyene is generally selected of 1,5-cyclooctadiene or 2-methyl (1-8-4-9)-tetrahydroindene.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator, such as methanol or water, and the organic solvent is removed. The solvent may be removed by injecting the solution into a body of boiling water to which steam is supplied. The polymer forms into a crumb which is removed as a slurry from the vessel and the polymerization solvent is withdrawn overhead as a vapor. The crumb may be freed of traces of solvent and washed to free the crumb of catalyst residues after which the water is removed by means of a screen or other dryer.

Various techniques had been developed for the removal of moisture and for drying the crumb prior to packaging. With EPM and EPDM elastomers, the water is squeezed from the crumb by compression, such as by means of an extractor, such as an oil extractor for squeezing oil from pulp. The crumb from which the water is extracted is then baled and wrapped for packaging for shipment to distant stations of use.

Water is removed from crumb formed of natural rubbers, SBR rubbers, nitrile rubbers and black masterbatch formed with such rubbers by spreading the crumb to form thin layers on drying pans which are advanced through air drying ovens at elevated temperature or, more recently, by means of continuous fluid bed dryers, as described in the Gerlicher U.S. Pat. No. 3,767,605.

Crumb processed by the various techniques described still tends to agglomerate to form a mass which resists easy separation for weighing into desired increments and/or for feeding processing equipment for admixture with other materials compounded with the elastomeric material to form elastomeric products. Thus, considerable effort has been expended towards the production of elastomeric material in the form of a free flowing powder, crumb, or other particulate in which the free flowing characteristics are retained in packaging and which can be poured as a free flowing elastomeric material for weighing or compounding with other materials in the conversion to form elastomeric products.

It has been found that such free flowing characteristics can be achieved in accordance with the practice of this invention by processing the elastomeric material during particulate formation, and preferably after the elastomeric material has been formed into particles of the desired configuration, by treatment of the formed elastomeric material with the combination of a finely divided partitioning agent and a resinous material that fibrilates when worked at elevated temperature to form a network or web on the surface of the elastomeric particles, in which the partitioning agent becomes entrapped. The partitioning agent and the fibrilating agent can be added simultaneously to the formed particles of elastomeric material or the fibrilating agent can be added first and fibrilated to form the web before the partitioning agent is added thereto.

The desired fibrilating characteristics can be obtained by the use of a polytetrafluoroethylene resin of the type marketed by E. I. DuPont under the name "Teflon K". Such fibrilating material is made available in the form of a free flowing powder (Type 10) or as an aqueous suspensoid (Type 20). The basic particle size in both the powder and suspensoid averages about 0.2 microns, but the particles are agglomerated in the dry powder form whereby the particles average about 500 microns. Teflon K Type 10 has the following characteristics:

| | |
|---|---|
| Average Particle Size | 500 Microns |
| Bulk Density | 450 g/l |
| Intrinsic Density | 2.2 g/ml |
| Surface Area | 10M$^2$/g |
| Crystallinity | 95% |
| Melting Range | 320°–340° C. (608°–644° F.) |
| Solubility | Insoluble in all common solvents |

Teflon K Type 20 suspensoid may be characterized as follows:

| | |
|---|---|
| Specific Gravity at 33% Solids | 1.22 |
| pH | ca. 10 |
| Viscosity at Room Temperature | 2–8 Centipoises |
| Active Ingredients at 33% Solids | 3.34 Lbs./Gal. |
| Solubility of Active Ingredients | Insoluble in all common solvents |

The Teflon is fibrilated to form a porous web or network on the surfaces of the elastomeric particles by first mixing the Teflon and particles of elastomeric materials as by means of a blender or the like, and then by working the mixture in a manner to provide compressive shear while at an elevated temperature of between 75° to 250° C. and preferably at a temperature of 100° to 125° C. The desired working action can be provided by movement of the particles in a blender, ball mill, muller, or by slow mixing with a spatula or paddle wheel. The desired fibrilation can be achieved under the conditions described in a matter of a few minutes, although it is desirable to provide for an amount of time up to 20 to 30 minutes, depending somewhat upon the type of equipment used for fibrilation. Mixing and fibrilation can be achieved simultaneously, as by means of a blender, ball mill or the like, but for optimum utilization of the fibrilating material, with corresponding reduction in the amount required, it is preferable uniformly to distribute the particles of the fibrilating material before working to form the porous web on the surface of the elastomeric particles.

Excellent results have been achieved by the use of a fluid bed dryer of the type described in the aforementioned Gerlicher patent for mixing and fibrilation at elevated temperatures, or for fibrilation at elevated temperatures after the fibrilating material has been mixed with the particles of elastomeric material.

Representative of the partitioning agents that can be used in the combination with the fibrilating material to produce the free flowing elastomeric particles of this invention, are fine talc, calcium carbonate, satin white, powdered clays such as Dixie clay, anhydrous clay (Whitex), zinc stearate, colloidal silica such as HiSel 233 and diatomaceous earth, and preferably a synthetic calcium silicate of the type marketed under the trade name Microcel-E which is a synthetic calcium silicate having the following characteristics:

| | |
|---|---|
| Color | Off White |
| Brightness, Tappi Method | 68 |
| Bulk Density, lbs./cu.ft. | 5.5 |
| Water Absorption, % by weight | 560 |
| Oil Absorption, % by weight | 490 |
| 325 Mesh Residue, % by weight | 1.0 |
| pH, 10% Water Slurry | 8.4 |
| Moisture, % by weight | 5.0 |
| Surface Area, B.E.T. Method sq. meters/gram | 110 |
| Specific gravity | 2.45 |
| Refractive Index | 1.55 |

When used alone, the fibrilated Teflon K does not provide the desired free flowing characteristics to the particles of elastomeric material. The partitioning material, when used alone, temporarily maintains some separation between the elastomeric particles but it soon migrates into the elastomeric material and becomes relatively inactive for maintaining particle separation. With the combination of the network or web of Teflon K and the partitioning agent, it appears that the partitioning agent becomes entrapped in the network of fibrilated material and is thus retained in position to maintain the separation for substantially continuous free flow of the elastomeric particles.

Very little of the fibrilating material is required to provide the desired web for the treatment of the partitioning agent. Improvement is observed when the fibrilating material is present in an amount as low as 0.01% by weight of the elastomeric material but it is preferred to make use of an amount of fibrilating agent such as Teflon K, within the range of 0.03 to 0.2% by weight, and more preferably in an amount of about 0.05% by weight of elastomeric material. The amount of partitioning agent can be varied within the range of 0.5 to 5% by weight of the elastomeric material, and preferably an amount within the range of 2 to 4% by weight. Added benefits do not warrant an increase in the amount beyond 5% by weight since only about 3% is retained by the network of fibrilated material on the surfaces of the elastomeric particles. Thus the combination enables improvement in free flow to be achieved with lesser amounts of partitional material than would otherwise be required.

Having described the basic concept of this invention, illustrations will now be made by way of the following example:

EXAMPLE 1

A nitrile rubber crumb is introduced into a fluid bed dryer along with Microcel-E and Teflon K Type 10 powder in the ratio of 5 pounds of Microcel-E and 2.25 grams of Teflon K per 95 pounds of rubber.

The fluid bed dryer of the type described in the Gerlicher patent is operated with the introduction of fluidizing air at a temperature within the range of 100° to 125° C. whereby the particles of rubber, Teflon K and Microcel-E are kept in motion until the material traverses the unit in about ½ to 2 minutes. The Teflon K becomes fibrilated under the working conditions to provide a network on the surface of the elastomeric particles in which only about 3 pounds of the Microcel-E is retained on the elastomeric material. Comparisons were made with the same elastomeric materials, processed under the same conditions and in the same equipment, with other partitioning materials including fine talc, anhydrous clay (Whitex), Dixie clay, Microcel-E alone, HiSel 233, Teflon K Type 10 alone, and with Nysynblak 9010 of Copolymer Rubber and Chemical Corporation of Baton Rouge, Louisiana. As a control the test procedure comprised preheating the processed material to a temperature of 120° F. and then forming bales of 300 grams weight by molding for 5 minutes under 1500 kg pressure.

The bales were subjected to partitioning tests performed on a Sweco shaking screen (7.5 mm. screen openings) at 3725 RPM. Measurements were made every minute for 7.5 minutes to determine the amount of material passing through the screen. If all of the material passed through the screen before one minute, the measurement was the time watch for completing throughput. Bales were tested after aging for one and 40 days. The results are set forth in the following tabulation:

| Partitioning Agent | Bale Aging Days | Bale Height | Sweco Time | | | | | | |
|---|---|---|---|---|---|---|---|---|---|
| | | | 1 | 2 | 3 | 4 | 5 | 6 | 7.5 |
| Fine Talc | 1 | 2.8 | 171 | (75 Secs) | | | | | |
| | 40 | 2.3 | 30 | 54 | 78 | 90 | 98 | 106 | 127 |
| Whitex | 1 | 2.8 | (10 Secs) | | | | | | |
| | 40 | 2.7 | (27 Secs) | | | | | | |
| Dixie Clay | 1 | 2.8 | 117 | 228 | 271 | 298 | | | |
| | 40 | 2.7 | 1.06 | 2.1 | 14 | 27 | 33 | 37 | 53 |
| (Teflon K | 1 | 2.9 | (9 Secs) | | | | | | |
| Microcel E) | 40 | 3.0 | (7 Secs) | | | | | | |
| Microcel E | 1 | 3.3 | 57 | 114 | 145 | 175 | 194 | 217 | 255 |
| | 40 | 3.0 | 25 | 39 | 49 | 56 | 63 | 69 | 83 |
| HiSel 233 | 1 | 2.9 | (10 Secs) | | | | | | |
| | 40 | 2.8 | (29 Secs) | | | | | | |
| NYsynblak 9010 | 1 | 2.6 | 12.4 | 24.4 | 33 | 42 | 51 | 59 | 79.4 |
| | 40 | 2.7 | 7.3 | 13.4 | 17 | 21 | 25.0 | 28 | 34 |
| Teflon K | | 2.7 | .8 | 1.3 | 1.8 | 2.1 | 2.3 | 2.4 | 2.9 |

It will be seen that Teflon K alone interferes with the partitioning of the bale elastomeric material and that separation is not completed within the time frame of the test either with Teflon K or when the elastomeric material is treated with Microcel-E alone. Best results are secured when the elastomeric particles of nitrile rubber are treated with a combination of Teflon K and Microcel-E in accordance with the practice of this invention.

In the foregoing example, the Microcel-E can be substituted in whole or in part with other finely divided partitioning agents such as fine talc, clays, diatomaceous earth, silica colloidal silica and the like and fibrilation while working at elevated temperatures is exhibited by such other synthetic polymeric materials as polyethylene, polypropylene, copolymers of ethylene and propylene and mixtures thereof.

It will be understood that changes made in the details of formulation and processing, without departing from the spirit of the invention especially as defined in the following claims.

I claim:

1. The method of producing free flowing elastomeric particles comprising mixing in the dry state the particles of elastomeric material with a fibrillating synthetic resinous material and a finely divided partitioning agent, moving the particles of elastomeric material and the fibrillating synthetic resin relative to each other in a dry mixing operation at elevated temperature and in the presence of the partitioning agent whereby the synthetic resinous material fibrillates to form a porous network on the surface of the particles of elastomeric material in which the partitioning agent becomes entrapped to be retained in position to maintain separation for free flow of the elastomeric particles.

2. The method as claimed in claim 1, in which the fibrilating synthetic resinous material is a polytetrafluoroethylene polymer and in which fibrilation is achieved by working with movement of the particles while at a temperature within the range of 100° to 125° C.

3. The method as claimed in claim 1, in which the partitioning agent is a synthetic calcium silicate.

4. The method as claimed in claim 1, in which the partitioning agent is present in an amount within the range of 0.5 to 5.0% by weight of the elastomeric material.

5. The method as claimed in claim 1, in which the fibrilating resinous material is present in an amount within the range of 0.01 to 1.0% by weight of the elastomeric material.

6. The method as claimed in claim 2, in which the polytetrafluoroethylene polymer is present in an amount of about 0.05% by weight of the elastomeric material.

7. The method as claimed in claim 1, in which working is carried out by movement of the material in a fluidized state while at elevated temperature.

8. The method as claimed in claim 1, in which the partitioning agent is added after the synthetic resinous material has been fibrilated to form a porous network on the surface of the elastomeric particles.

9. The method as claimed in claim 1, in which the fibrilating synthetic resinous material is selected from the group consisting of polyethylene, polypropylene and copolymers thereof or mixtures thereof.

* * * * *